INVENTOR.
FRANK H. HIGHLEY

March 11, 1958 F. H. HIGHLEY 2,826,278
HYDRAULIC APPARATUS FOR ANTI-SKID OR MANUAL
CONTROL OF BRAKES WITH SAFETY
LOCKOUT OF ANTI-SKID CONTROL
Filed April 20, 1954 2 Sheets-Sheet 2

INVENTOR.
FRANK H. HIGHLEY
BY
ATTORNEY

United States Patent Office 2,826,278
Patented Mar. 11, 1958

2,826,278

HYDRAULIC APPARATUS FOR ANTI-SKID OR MANUAL CONTROL OF BRAKES WITH SAFETY LOCKOUT OF ANTI-SKID CONTROL

Frank H. Highley, Canton, Ohio, assignor to The Goodyear Tire & Rubber Company, Akron, Ohio, a corporation of Ohio Application April 20, 1954, Serial No. 424,407

3 Claims. (Cl. 188—181)

This invention relates to apparatus for reducing skidding of hydraulically-braked vehicle wheels, and, more particularly, is concerned with automatic mechanism functioning to provide for the normal manual operation of the brakes even though the skid reducing apparatus fails to function.

The invention is especially useful in connection with the "Anti-Skid Mechanism for Master Cylinder Operated Brakes" disclosed in the application of Mark I. Curl, et. al., Serial No. 248,756, filed September 28, 1951, now Patent No. 2,753,017. In that application mechanism is provided for relieving brake pressure when the beginning of a wheel skid is sensed, the brake pressure being relieved by storing fluid from the system in a storage chamber. Relieving the brake pressure stops the skid which was beginning, and the brakes are reapplied by returning to the system the fluid from the storage chamber. If for any reason the fluid could not be returned from the storage chamber, the manually-operated brake pedal would drop to the floor and brake pressure would be lost unless the pressure would be "pumped up" by pumping the brake pedal and master cylinder.

It is the general object of the present invention to improve the apparatus of the Curl application so that if for any reason the fluid cannot be returned from the storage chamber to the brake system, the brake system will continue to function manually without loss of brake pedal pressure and without the necessity to "pump" the brake pedal to draw extra fluid from the master cylinder.

Other objects of the invention are to provide normal manually controlled braking upon undesirable reduction or failure of anti-skid control pressure, to provide a unitary anti-skid control and lockout control apparatus and an improved valve therefor; and generally to provide safety of operation, reduction of weight of apparatus, simplicity of structure, and long and maintenance free life.

These and other objects will appear from the following drawings and the accompanying description.

Figure 1:
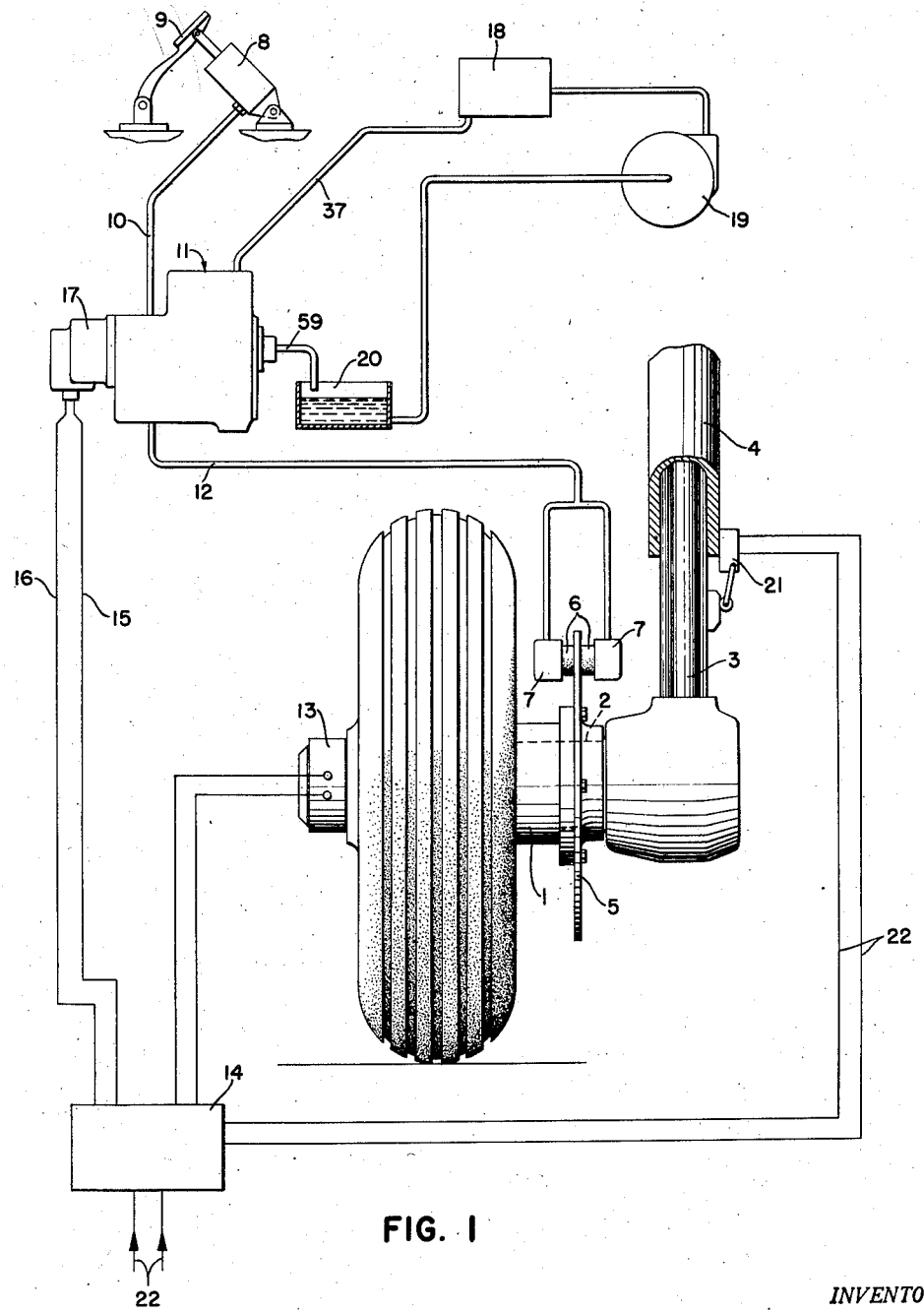
Fig. 1 is a longitudinal sectional view of the automatic lockout and brake pressure control valve of this invention together with a diagrammatic showing of the manually-controlled master cylinder, the auxiliary hydraulic pressure fluid supply, the wheel and brake, the securing means and the necessary wiring and pipe connections.

Referring to the drawings, and first to Fig. 1 thereof, the numeral 1 designates a rotatable member, such as a wheel, freely mounted on an axle 2, for example secured to a sliding portion 3 of a support 4. The wheel carries a rotatable brake element, typically a disc 5, mounted to be engaged by non-rotary brake shoes 6, 6 operated by fluid pressure cylinders 7, 7, the arrangement being such that when fluid pressure is applied to cylinders 7, 7, braking pressure is applied to the brake disc 5 to decelerate the wheel 1.

Fluid pressure to cylinders 7 is provided by a master cylinder 8 operated by a pedal 9 controlled by the operator and passes fluid to a pipe 10 and normally through the automatic lockout and pressure control valve 11 and by way of pipe 12 to cylinders 7, 7.

To prevent such severe application of the brake as would lock or unduly skid the wheel with the wheel in contact with the ground and the wheel carrying vehicle in motion, the said application of Mark I. Curl et al. provides an acceleration or deceleration responsive mechanism, for example, a wheel driven generator 13, at the wheel. The generator 13 actuates a control mechanism 14, usually including a relay, to supply an energizing voltage through wires 15, 16 to a solenoid 17 adapted to control a two-way valve in the line between pipes 10 and 12 in such manner as to shut off the pressure line between master and brake cylinders when brake deceleration is too rapid, i. e. when a skid is developing. Said Curl et al. application also provides a storage cylinder to receive and store fluid from the pipe 12 and brake cylinders 7, 7, when the brake pressure is shut off, to thereby allow movement of the brake shoes 6, 6 away from the disc 5. The wheel 1 then comes back up to speed and the fluid stored is returned to the pipe 12 and brake cylinders 7, 7 to reestablish braking force, and pipe 10 is reopened to pipe 12. To discharge the fluid from the storage chamber a high pressure reservoir 18 is provided which may be kept under pressure by a pump 19 supplying liquid from a return sump 20. Or high pressure may be supplied from the high pressure hydraulic system, the engine oil pressure system or a compressed air system associated with the vehicle.

The Curl et al. application also employs a switch, such as 21, mounted on the support 4 and engageable with a cam on the sliding portion 3. When the wheel 1 is on the ground and the strut has partially telescoped to close the switch 21, electrical connections are provided whereby solenoid 17 is deenergized to allow valve 11 to assume the position of Fig. 3 to provide for the operation of the brakes only after the airplane is on the ground. Before this time the electrical connections are such that solenoid 17 is held energized by input voltage 22 and the valve 11 is thus in the position of Fig. 2 making the brakes inoperative and preventing locking of the wheels with the brakes at touchdown of the airplane.

While the apparatus of the Curl et al. application has given excellent results in operation, it is desirable to provide for master cylinder control only of the brake in case of failure of the high pressure supply 18 and to provide for lockout of the "anti-skid" mechanism until high pressure is restored. To accomplish these objects and also to provide a unitary automatic lockout and a compact, light-weight pressure control valve unit for this purpose the lockout and valve unit 11 includes a body 23 (see Figs. 2 and 3) having a longitudinal bore 24 therethough for slidably receiving a valve spool 25. The solenoid 17 heretofore mentioned is mounted on the end of the valve body and is adapted when energized to move the spool axially towards the solenoid against bearing pressure of a spring on the solenoid (not shown) which holds the spool in the position illustrated in Fig. 3 when the solenoid is not energized.

The valve body 23 has an inlet port 26 connected to the master cylinder 8 by pipe 10 and to the bore 24. It also has an outlet port 27 in alignment with the port 26 connecting the bore 24 to brake cylinders 7, 7, through pipe 12. An annular groove 28 in spool 25 normally connects port 26 to port 27, as in Fig. 3, when the spool 25 is at its extreme right position (solenoid 17 not energized), but is moved to the left as in Fig. 2 to disconnect the brake cylinders 7, 7 from master cylinder 8 when solenoid 17 is energized.

A storage chamber 29 is also formed in the valve body and connects to port 27 for storing brake-operating fluid to relieve braking pressure when the passage between ports 26 and 27 is closed, and for returning the stored fluid to the system when ports 26 and 27 are connected. For this purpose, the chamber 29 may be formed, as in the example shown, as the smaller bore 30 of a stepped cylinder having a large bore 31, the large bore being closed by a cap plug 32 secured to the valve body by threads. A stepped piston 33 fits both bores and has sealing rings 34 and 35 thereabout. The large bore 31 of the cylinder is connected to the valve bore 24 by a port 36 and is normally in communication with the high pressure supply pipe 37 through a passage 38 opposite to port 36 by virtue of a wide annular groove 39 formed in the spool 25. Arrangement is such that communication is maintained at all positions of the spool, except as hereinafter explained, so that the piston 33 is subjected to pressure via port 27 at its small end and to a superior pressure force from the high pressure supply line 37 at its large end so as normally to be positioned at the left end of the storage chamber 29. Thus, the piston 33 can act to relieve pressure in brake cylinders 7, 7 by movement to the right under reduction or loss of pressure in bore 31 by exhaust of fluid therefrom when the spool closes port 27, as hereinafter described.

It will be recognized that the relation of pressures in pipes 10 and 37 (adapted to act on opposite sides of piston 33) is so correlated with the area of the opposite ends of piston 33 so that the resultant forces cause the piston to be driven to the left when pipe 37 is connected to apply its pressure on the right hand end of the piston. In other words, piston 33 does not have to have a larger diameter at its right hand end than at its left. The important thing is that the total force on the right hand end, i. e. fluid pressure times area, is greater than the total force on the left hand end of the piston, all for reasons aforesaid.

A check valve 40 is provided in passage 38 and is held against a seat 41 provided in a counterbore shoulder by a coil spring 42 seated on a collar 43 threaded in the counterbore, the collar having a central guide hole to receive the stem of the valve and a plurality of vent holes surrounding it to permit passage of fluid past the collar. The arrangement is such that upon failure of pressure in line 37, the valve 40 closes off return to the line 37 and piston 33 is maintained in its left hand position. With piston 33 to the left no fluid is stored in chamber 29 and there is no loss of brake pedal pressure in the manually operated brake system.

To provide for exhaust of fluid from the right hand end of bore 31 of storage chamber 29 an axial bleeder port 44 is formed in the spool 25 open to its right hand end to which connects a side port 45 extending to an annular groove 46 on the spool 25 spaced from the groove 39. A port 47 in the valve body connects the port 36 to ports 45 and 44 when the solenoid 17 is energized and the spool 25 is at the left hand position, as in Fig. 2. Port 47 is sealed off by the body of the spool 25 when the solenoid 17 is not energized and the spool is at its right hand position, as in Fig. 3. Thus, the right hand end of bore 31 may be alternately connected to the high pressure supply line 37 or to the sump by axial movement of the spool 25 by de-energizing or energizing respectively of the solenoid 17. It will be seen that when the spool 25 is moved to the left by energizing of solenoid 17, fluid from the right hand end of piston 33 promptly escapes through ports 47, 45 and 44 to permit piston 33 to move to the right (under the pressure of conventional return springs associated with brake shoes 6, 6) storing fluid in chamber 29, and relieving brake pressure.

For reasons already discussed, it is advantageous to the safety of the brake operating system that some means be provided for insuring adequate manual operation of the brakes without loss of pedal pressure in case of undesirable reduction or failure of the auxiliary pressure supply 18. This is accomplished in the present invention by mechanism for locking the spool 25 in the position of Fig. 3 should the pressure in pipe 37 be lost or materially reduced.

To provide for lockout of the spool 25 against movement by the solenoid 17 to the left upon failure of pressure in line 37, a cylinder 48 is formed in the valve body 23 with its axis normal to and in the plane of the axis of the spool bore 24 and a passage 49 of reduced diameter coaxial thereof extends from the cylinder 48 to connect with the bore 24. A lock pin 50 is slidably mounted in the passage and has a piston head 51 slidably fitted in the cylinder 48. The valve spool 25 is formed with an annular lock groove 52 in position to receive the end of the pin 50 when the spool is at extreme right position, as in Fig. 3, where a radial shoulder 53 of the groove 52 is locked against movement to the left by the pin.

For holding the pin 50 in locking engagement biasing means, such as a coil spring 54 is mounted in cylinder 48 against the upper face of piston 51 and is held under compression by a plug 55 threaded in the upper end of the cylinder 48. A vent hole 56 through plug 55 communicates between the upper end of cylinder 48 and the atmosphere to relieve pressure in the upper part of cylinder 48.

Figure 3:
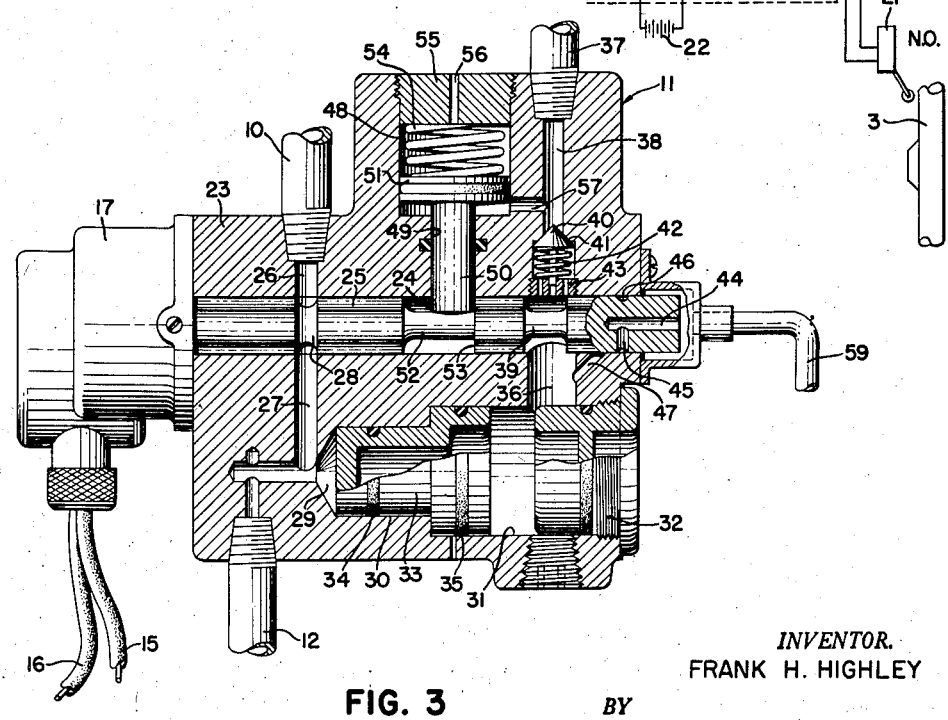
Fig. 3 is a similar view showing the mechanism in the locked out position resulting from sub-normal pressure or failure of the auxiliary hydraulic pressure system, the spool valve being at the extreme right position.

For holding the pin 50 in its upper or disengaged position when fluid at proper pressure is supplied to pipe 37, a port 57 is provided in the valve body which connects the lower end of cylinder 48 with pipe 37. Thus, when adequate pressure from pipe 37 is present piston 51 is held upward compressing spring 54 and pin 50 is withdrawn from groove 52 permitting axial movement of spool 25, but when such pressure is inadequate, spring 54 forces pin 50 against the spool and locks it against axial movement, as shown in Fig. 3. In such position of the valve spool 25 the groove 28 connects pipe 10 and pipe 12 so that manual operation of the brake is insured while automatic "anti-skid" operation thereof is locked out. Should the pressure in line 37 be restored pin 50 is automatically withdrawn, valve 40 opens, and automatic brake control is again provided.

Figure 4:
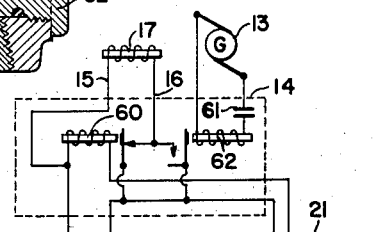
Fig. 4 is a wiring diagram of the electrical circuits.

The electrical arrangement of the mechanism is illustrated in Figure 4, from which it will be seen that the solenoid 17 is in a normally closed circuit including the supply 22 and the normally closed contacts of a normally closed solenoid switch 60, the solenoid of which is in series with the supply 22 and switch 21. The arrangement is such that solenoid 17 is normally energized but is deenergized by closing of switch 21. The generator 13 is in series with a capacitor 61 and the solenoid of a normally open solenoid switch 62. The contacts of solenoid switch 62 are in series with the supply 22 and solenoid 17, so that closing of these contacts caused by decrease of voltage from generator 13 will energize solenoid 17. As the capacitor 61 will not pass a direct current, solenoid 62 is only energized by rapid change in voltage.

The operation of the apparatus is as follows: Wheel 1 must be on the ground with enough weight thereon to close switch 21 and open solenoid valve 11 before any brake pressure can be applied. Now, assuming that pipe 37 is supplied with adequate pressure, the pin 50 is held in unlocked, i. e. raised position by the pressure in pipe 37. Upon the operator depressing the piston of the master cylinder 8, fluid under pressure is forced through pipe 10, around groove 28 and by way of port 27 and pipe 12 to cylinders 7, 7 applying the brakes.

As long as the brake shoes 6, 6 are not applied so tightly against the disc 5 as to cause the wheel 1 to begin to skid, the braking operation will continue as described with the parts of the valve 11 being as shown in Fig. 3, but with pin 50 raised out of groove 52. During this braking operation a gradually decreasing voltage is generated by wheel driven generator 13.

However, in actual practice in order to get maximum braking effect out of the system, the pressure supplied by master cylinder 8 to cylinders 7, 7 moves shoes 6, 6 against the disc 5 with sufficient force to slow it down faster than the normal non-skidding deceleration of the wheel. In other words, the braking action is such that surface of the wheel 1 against the ground is beginning to slip. This greater than normal deceleration causes a relatively sharp drop in the voltage generated by generator 13, and as explained in the said Curl et al. application, this causes a relay in control mechanism 14 to close supplying operating voltage from the input voltage to the solenoid 17.

Figure 2:
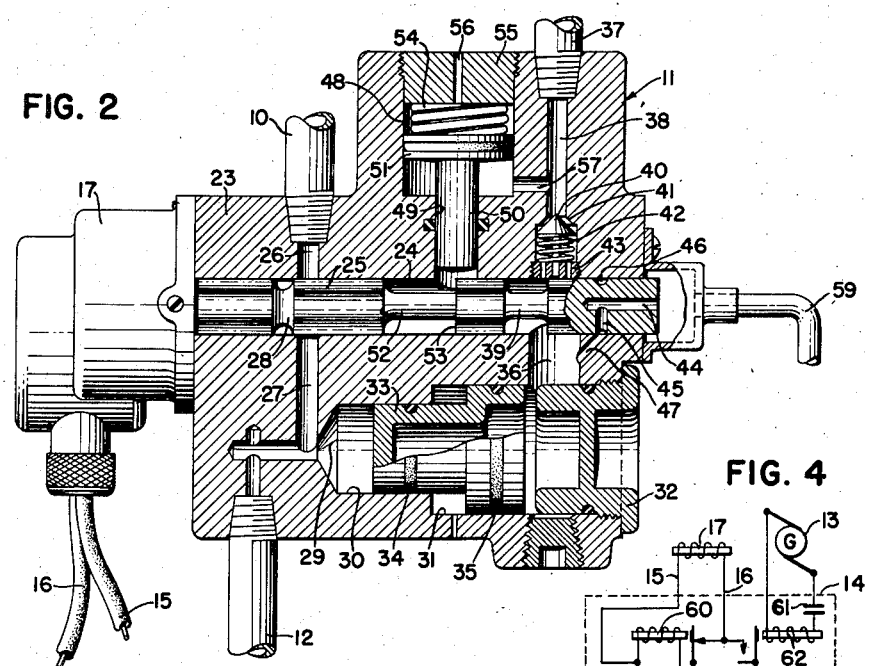
Fig. 2 is a longitudinal sectional view of the automatic lockout and brake pressure control valve with the normal pressure of the auxiliary hydraulic pressure system applied thereto and the spool valve moved to the extreme left position by energizing of the solenoid controlling brake application.

Operation of solenoid 17 quickly moves valve spool 25 into the position shown in Fig. 2 to shut off pipe 10 from pipe 12. Port 47 is likewise connected to ports 45 and 44 and fluid under pressure to the right of piston 33 is quickly bled via pipe 59 to sump 20. This causes piston 33 to move to the right towards the position shown in Fig. 2 and the pressure on brake shoes 6, 6 is relieved by the opening up of storage chamber 29. The return springs usually associated with cylinders 7, 7 assist in movement of the piston 33 to the right.

Relieving the brake pressure as described immediately stops the beginning of the skid on wheel 1 and causes it to quickly resume normal ground speed. This reestablishes the initial relation of the control mechanism 14 and generator 13, and solenoid 17 is de-energized causing spool 25 to return to the position of Fig. 3, but with pin 50 still held out of the way by pressure through port 57 to the under side of the piston 51. The return of spool 25 to the position of Fig. 3 cuts off port 47 and pressure is re-established to the right of piston 33 via port 36, check valve 40, groove 39 and port 36 to move the piston 33 to the left, as shown in Fig. 3. This movement returns the fluid from storage chamber 29 to pipe 12 to re-establish brake pressure of the shoes 6, 6 against the disc 5.

It will be recognized that without the return of the fluid from storage chamber 29 to the brake system as described, the pedal 9 under the control of the operator would drop towards or to the floor with possible loss of brake pressure.

The on-off application of the brakes as described continues with a rapid cycling action under the control of the control mechanism 14 and the acceleration (really deceleration) responsive means 13, all as fully described in said Curl et al application. Actually in the rapid action, piston 33 never moves as far to the right as shown in Fig. 2, but the net result is as described together with a much more efficient application of the brakes, and a shorter stop, than if they were under the full control of the operator.

Now should it develop, for any reason, that pressure is lost or materially reduced in pipe 37, spring 54 moves pin 50 downwardly to lock in groove 52, as shown in Fig. 3. In this position of the parts check valve 40 closes to trap fluid to the right of piston 33 with the piston substantially fully to the left and with little or no fluid in storage chamber 29. The spool 25 is locked against movement with pipe 10 connected to pipe 12 and the braking operation is under full control of the operator through pedal 9 with the operation of control mechanism 14 being ineffective, and without pedal 9 having dropped towards the floor.

It is to be noted that if the failure of pressure in pipe 37 occurs before braking starts that pin 50 moves into locking position as described because until solenoid 17 is operated the groove 52 lies opposite pin 50. If, however, pressure failure occurs during on and off brake operation, it has been found that there is enough time and back and forth movement of spool 25 under action of solenoid 17 to allow pin 50 to lock in groove 52.

While a certain representative embodiment and details have been shown for the purpose of illustrating the invention, it will be apparent to those skilled in this art that various changes and modifications may be made therein without departing from the spirit or scope of the invention.

I claim:

1. In combination, a rotatable member, hydraulic means for braking said member, a master cylinder for supplying fluid under pressure to the hydraulic means, valve mechanism including a body, a spool slidably mounted in the body, spring means holding said spool resiliently in one position and having solenoid means for moving the spool to a second position, means operable upon too rapid deceleration of the rotatable member for operating the solenoid, said body and spool having ports connecting the master cylinder and hydraulic means in said one position of the spool and disconnecting the same in said second position of the spool, said body having a fluid storage chamber connected to the hydraulic means and having a movable wall for varying its capacity, a fluid pressure source, the body and spool having an inlet port for connecting with the fluid pressure source and applying pressure to the opposite side of said movable wall in said one position of the spool and a second port for connecting said opposite side of the movable wall to reduced pressure in said second position of the spool, a one-way valve in said inlet port of the body connected to the fluid pressure source allowing flow only toward said body from said source, said body having a lock pin chamber, a lock pin slidable therein, resilient means urging said lock pin into spool locking engagement with the spool when the spool is in said one position, and piston means associated with the lock pin, said body having a passage connected with the fluid pressure source and extending to the piston means for holding the lock pin out of engagement with the spool when adequate fluid pressure exists at the source.

2. In combination, a rotatable member, hydraulic means for braking said member, a master cylinder for supplying fluid under pressure to the hydraulic means, valve mechanism including a body, a spool slidably mounted in the body, spring means holding said spool resiliently in one position and having solenoid means for moving the spool to a second position, means operable upon too rapid deceleration of the rotatable member for operating the solenoid, said body and spool having ports connecting the master cylinder and hydraulic means in said one position of the spool and disconnecting the same in said second position of the spool, said body having a fluid storage chamber connected to the hydraulic means and having a movable wall for varying its capacity, a fluid pressure source, the body and spool having an inlet port for connecting with the fluid pressure source and applying pressure to the opposite side of said movable wall in said one position of the spool and a second port for connecting said opposite side of the movable wall to reduced pressure in said second position of the spool, a one-way valve in said inlet port of the body connected to the fluid pressure source allowing flow only toward said body from said source, said body having a lock pin chamber, a lock pin slidably carried by said body, a piston head on said lock pin slidably fitting said lock pin chamber, a spring urging said lock pin into locking engagement with the spool in said one position upon failure of pressure from said fluid source, and means connecting said lock pin chamber to said fluid source to balance the pressure of said spring so as normally to hold said lock pin in retracted position.

3. In combination, a rotatable member, hydraulic means for braking said member, a master cylinder for supplying fluid under pressure to the hydraulic means, valve mechanism including a body, a spool slidably mounted in the body and resiliently held in one position, means for moving the spool to a second position, means operable upon too rapid deceleration of the rotable member for operating the last-named means, said body and spool having ports connecting the master cylinder and the hydraulic means in said one position of the spool and disconnecting the same in said second position of the spool, said body having a fluid storage chamber connected to the hydraulic means and having a movable wall for varying its capacity, a fluid pressure source, the body and spool having an inlet port for connecting with the fluid pressure source and applying pressure to the opposite side of said movable wall in said one position of the spool and disconnecting the same in said second position of the spool and releasing pressure from the said opposite side of the movable wall, a lock pin slidably carried by said body, said lock pin having a piston head exposed to pressure from said pressure source to hold said lock pin in retracted position, and spring means acting upon said lock pin against said pressure source for advancing said lock pin into locking engagement before failure of such fluid pressure.

References Cited in the file of this patent

UNITED STATES PATENTS

| | | |
|---|---|---|
| 2,132,914 | Fitch | Oct. 11, 1938 |
| 2,649,169 | Holman | Aug. 18, 1953 |
| 2,753,017 | Curl et al. | July 3, 1956 |
| 2,759,570 | Shirey | Aug. 21, 1956 |